United States Patent
Yoshimoto

(10) Patent No.: US 7,116,920 B2
(45) Date of Patent: Oct. 3, 2006

(54) CONTROL OF IMAGE FORMING SECTIONS OF A PRINTING APPARATUS WITH COLOR REGISTRATION

(75) Inventor: Masahiro Yoshimoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/614,123

(22) Filed: Jul. 8, 2003

(65) Prior Publication Data
US 2004/0008997 A1    Jan. 15, 2004

(30) Foreign Application Priority Data
Jul. 11, 2002    (JP) .............................. 2002-202405

(51) Int. Cl.
*G03G 15/00*    (2006.01)
*G03G 15/01*    (2006.01)

(52) U.S. Cl. ........................... 399/13; 399/81; 399/299

(58) Field of Classification Search .................. 399/12, 399/13, 38, 39, 81, 110, 111, 112, 223, 228, 399/299, 123; 347/19, 115, 152, 172, 232, 347/245
See application file for complete search history.

(56) References Cited

U.S. PATENT DOCUMENTS

| | | | | |
|---|---|---|---|---|
| 4,619,514 A | * | 10/1986 | Ide ............................ | 399/81 X |
| 4,862,216 A | * | 8/1989 | Higashi et al. ............ | 399/81 X |
| 4,916,490 A | * | 4/1990 | Tanaka et al. ............ | 399/223 X |
| 4,937,626 A | * | 6/1990 | Kohtani et al. ............... | 399/12 |
| 4,937,627 A | * | 6/1990 | Ozawa et al. ............ | 399/223 X |
| 5,063,410 A | * | 11/1991 | Kinoshita et al. ............. | 399/12 |
| 5,666,612 A | | 9/1997 | Beachner et al. | |
| 5,754,924 A | * | 5/1998 | Yamada ....................... | 399/81 |
| 6,029,018 A | * | 2/2000 | Rogers et al. ................ | 399/12 |
| 6,055,006 A | | 4/2000 | Murano | |
| 6,285,842 B1 | * | 9/2001 | Katamoto et al. ............ | 399/81 |
| 6,324,352 B1 | * | 11/2001 | Suzuki ........................ | 399/13 |
| 6,369,843 B1 | | 4/2002 | Springett et al. | |
| 6,473,574 B1 | * | 10/2002 | Usui et al. .............. | 399/299 X |
| 6,498,905 B1 | * | 12/2002 | Tsuruya ....................... | 399/12 |
| 6,526,237 B1 | * | 2/2003 | Endo ...................... | 399/299 X |

FOREIGN PATENT DOCUMENTS

EP    1193574 A2    3/2002

\* cited by examiner

*Primary Examiner*—Sandra L. Brase
(74) *Attorney, Agent, or Firm*—Rabin & Berdo P.C.

(57) ABSTRACT

A printing apparatus has a plurality of image forming sections that are removably attached to a body of the printing apparatus and form images of different colors. The apparatus includes a specifying unit such as an operation panel and a control unit. The specifying unit specifies an image forming section that performs printing. The control unit controls the image forming section specified by the specifying unit to form an image of a corresponding color. The apparatus further includes a plurality of detectors that detect the presence and absence of corresponding image forming sections in the body. When the detector detects that a specified image forming section is present, the control unit controls the specified image forming section to operate. When the detector detects that the specified image forming section specified is absent, the control unit does not control the specified image forming section to operate.

14 Claims, 10 Drawing Sheets

CONTROL OF IMAGE FORMING SECTIONS OF A PRINTING APPARATUS WITH COLOR REGISTRATION

BACKGROUND OF THE INVENTION

1. Field of the Invention

The present invention relates to image forming apparatus such as color printers, color copying machines, and color facsimile machines. More particularly, the present invention relates to a printing apparatus of the tandem type in which a plurality of image-forming sections are aligned along the transport path of a print medium to sequentially form toner images of respective colors in registration with one another on the print medium.

The present invention also relates to a printer of an intermediate transfer method in which images are formed by a plurality of image forming sections and transferred onto an intermediate transfer material and then the images are further transferred from the intermediate transfer material to a print medium.

2. Description of the Related Art

Known image forming methods for color printers, color copying machines, and color facsimile machines are, for example, an intermediate transfer belt method and an intermediate transfer drum method including tandem type.

With a tandem type printer, yellow, magenta, cyan, and black images are formed by corresponding image forming sections and transferred onto a print medium in superposition. The prominent feature of a tandem type printer is that an image of four colors can be printed by a single passage of a print medium through the transport path.

A conventional printer is so designed that unless all of the image-forming sections are attached to the printer body properly, printing is not performed for any colors in combination, even a single color. If any one of the image-forming sections is not attached properly, an error handling operation is performed. Thus, even when a user wishes to print only black and red images, cyan and yellow image forming sections must be attached to the printer body. This is uneconomical.

SUMMARY OF THE INVENTION

The present invention was made to solve the aforementioned drawbacks.

An object of the invention is to provide a printing apparatus in which even if some image forming sections are not attached to the printer, printing can be performed only with the image forming sections attached to the printer.

An another object of the invention is to provide a printing apparatus that does not consume the consumable items of image forming sections not operated, thereby saving the running costs of the printer.

A printing apparatus has a plurality of image forming sections that are removably attached to a body of the printing apparatus and form images of different colors. The printing apparatus includes a specifying unit such as operation panel and a control unit. The specifying unit specifies an image forming section that performs printing. The control unit controls the image forming section specified by the specifying unit to operate to form an image of a corresponding color.

The printing apparatus further includes a plurality of detectors that detect the presence and absence of corresponding image forming sections in the body. When the detector detects that an image forming section specified by the specifying unit is present, the control unit controls the specified image forming section to operate. When the detector detects that the image forming section specified by the specifying unit is absent, the control unit does not control the specified image forming section to operate.

The printing apparatus further includes a plurality of detectors that detect the presence and absence of corresponding image forming sections in the body. When the detector detects that an image forming section not specified by the specifying unit is present, the control unit controls the specified image forming section to operate.

If print data contains a color corresponding to an image forming section not specified by the specifying unit, the control unit performs control in such a way that the print data is not processed in a format that can be printed.

If print data contains a color corresponding to an image forming section not detected by the detector, the control unit performs control in such a way that the print data is not processed in a format that can be printed.

A printing apparatus has a plurality of image forming sections that are removably attached to a body of the printing apparatus and form images of different colors. The printing apparatus includes a plurality of detectors and a control unit. The plurality of detectors detect the presence and absence of corresponding image forming sections in the body. The control unit selectively controls the image forming sections to operate according to detection results of the plurality of detectors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DESCRIPTION OF THE INVENTION

FIRST EMBODIMENT

Embodiments of the invention will be described with reference to the accompanying drawings.

Figure 1:
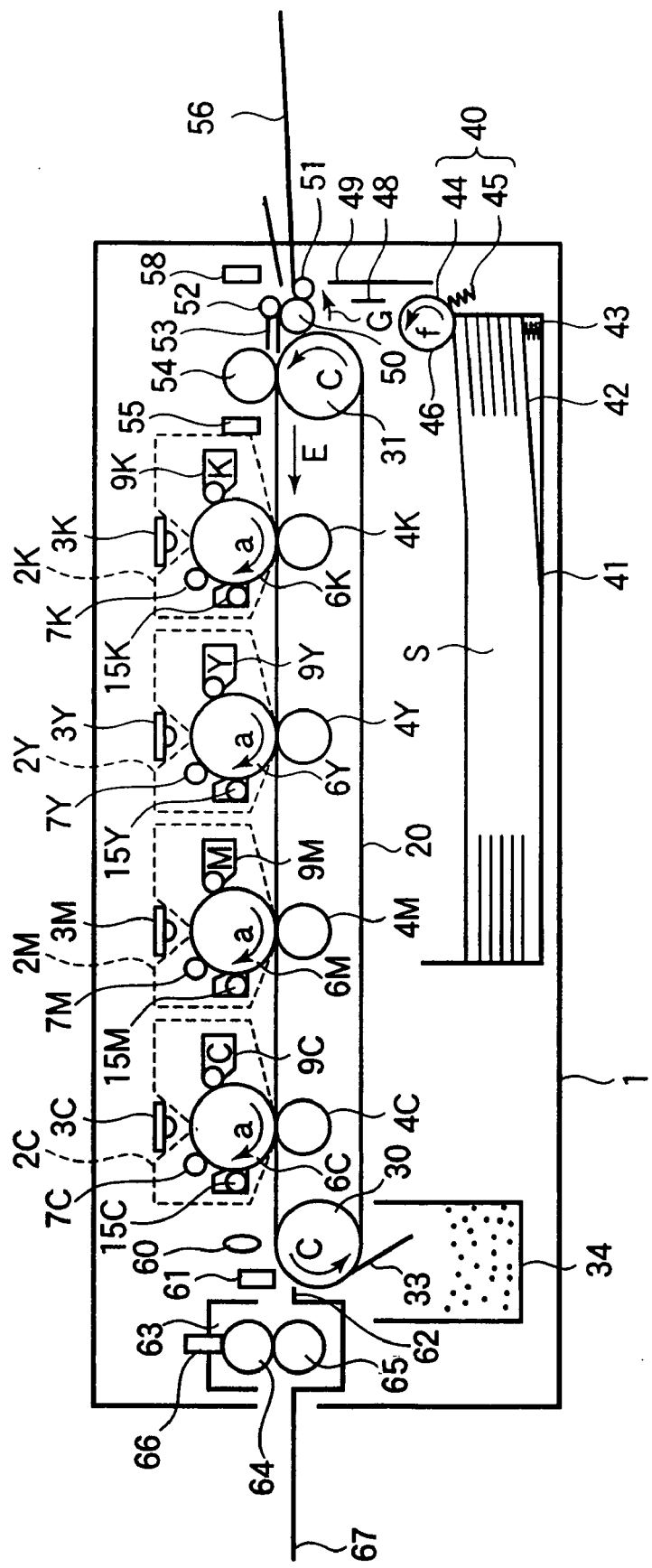
FIG. 1 illustrates the general configuration of a tandem type printer according to a first embodiment of the invention.

FIG. 1 illustrates the general configuration of a tandem type printer according to a first embodiment of the invention.

Referring to FIG. 1, four image forming sections 2K, 2Y, 2M, and 2C (hereinafter also referred to generally, or as a group, by number 2) are aligned along a transport path of a print medium. The image forming sections 2K, 2Y, 2M, and 2C are printing mechanisms that form images of black, yellow, magenta, and cyan respectively.

Each of the image forming sections respectively has a photoconductive drum 6, a charging roller 7 (referring generally to the group including charging rollers 7C, 7M, 7Y, and 7K), an LED head 3, a developing unit 9, and a cleaning unit that scrapes off residual toner on the photoconductive drum 6. LED heads 3K, 3Y, 3M, and 3C (above, and hereinafter, also referred to generally, or as a group, by number 3) illuminate the surfaces of photoconductive drums 6K, 6Y, 6M, and 6C (above, and hereinafter, also referred to generally, or as a group, by number 6) to form electrostatic latent images of the corresponding colors and then developing rollers develop the electrostatic latent images with toners of the corresponding colors, thereby forming toner images of the respective colors. The toner images of the respective colors are transferred by corresponding transfer rollers 4K, 4Y, 4M, and 4C (hereinafter also referred to generally, or as a group, by number 4) onto a print medium.

The developing units 9K, 9Y, 9M, and 9C (above, and hereinafter, also referred to generally, or as a group, by number 9) are detachably attached to the image forming sections 2K, 2Y, 2M, and 2O, respectively, which are individually driven by corresponding motors.

The developing process of the image forming sections 2K, 2Y, 2M, and 2C will be described.

Figure 2:
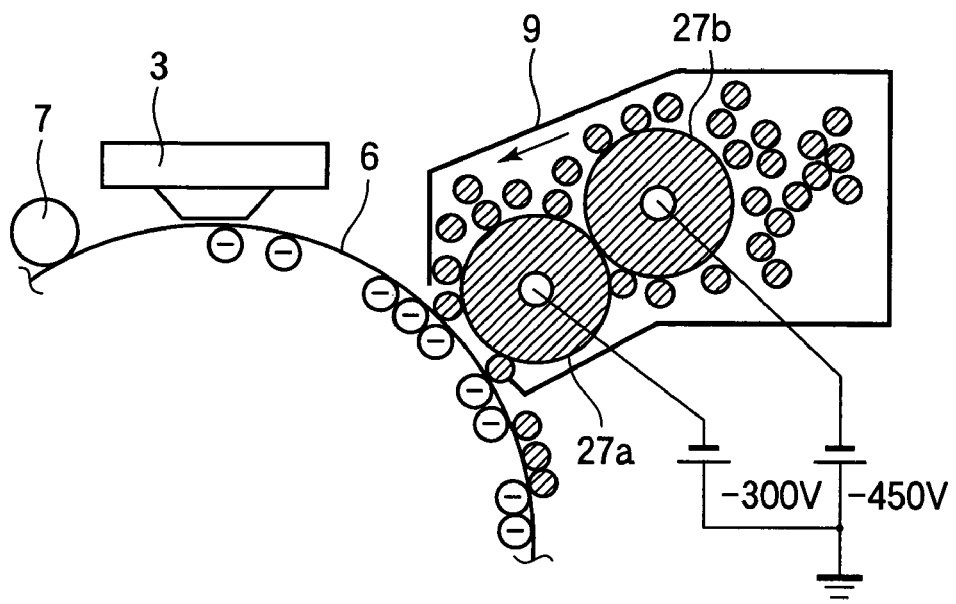
FIG. 2 illustrates the configuration of an exposing unit and a developing unit of a print mechanism.

FIG. 2 illustrates the configuration of an exposing unit and a developing unit of a print mechanism.

Figure 3A:
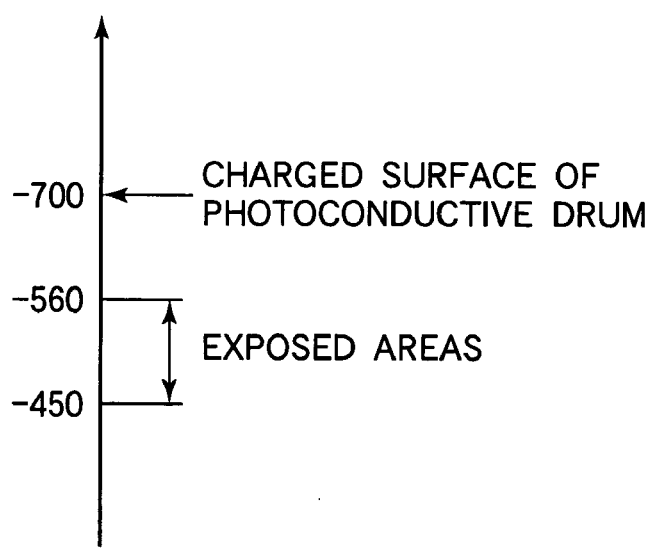
FIGS. 3A and 3B illustrate the potentials on a photoconductive drum and in a developing unit during exposing.
Figure 3B:
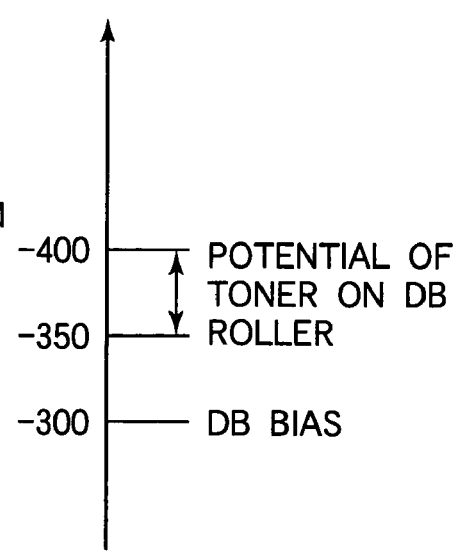

FIGS. 3A and 3B illustrate the potentials on a photoconductive drum and in the developing unit during exposing.

Referring to FIG. 2, the changing roller 7, LED head 3, and developing unit 9 are disposed around the photoconductive drum 6, and the developing unit 9 includes a developing roller (i.e., DB roller) 27a and a toner-supplying roller (i.e., SB roller) 27b. The developing unit 9 holds toner of a corresponding color therein. When the photoconductive drum 6 is rotated by a developing/transferring process motor, not shown, the charging roller 7 receives a negative voltage from a high voltage supply, not shown, so that the surface of the photoconductive drum 6 is charged to a potential of about −700 V. The charged surface of the photoconductive drum 6 is exposed to light, which selectively dissipates the charges on the photoconductive drum 6 in accordance with print data. The potential of exposed areas decreases to a potential in the range of 0 to −70 V, thereby forming an electrostatic latent image.

The voltages in the developing unit during developing process will be described with reference to FIG. 3A.

The photoconductive drum 6 is charged to about −700 V and areas exposed to light has a potential in the range of 0 to −70 V.

The developing roller 27a receives a voltage of −300 V and the toner-supplying roller 27b receives a voltage of −450 V. The developing roller 27b takes the form of a sponge roller and delivers an appropriate amount of toner to the developing blade. The toner particles held in the developing unit 9 are charged to a negative voltage.

When the developing roller 27a receives a bias voltage of −300 V, the toner is supplied from the toner-supplying roller 27b to the toner-developing roller 27a. Then, the toner is deposited as a developing toner on the developing roller 27a. The amount of charge of toner is in the range of about −50 to −100 V while the toner potential on the developing roller 27a is in the range of −400 to −350 V.

The potential of areas on the photoconductive drum 6 exposed to light is in the range of 0 to −70 V and the potential of areas not exposed to light remains about −700 V. Thus, the areas on the photoconductive drum 6 exposed to light attract the toner to form a visible image as a whole. Because the difference in potential between the areas exposed to light and areas not exposed to light is more than 200 V, the toner does not migrate from the developing roller 27a to the areas not exposed to the light.

Figure 4:
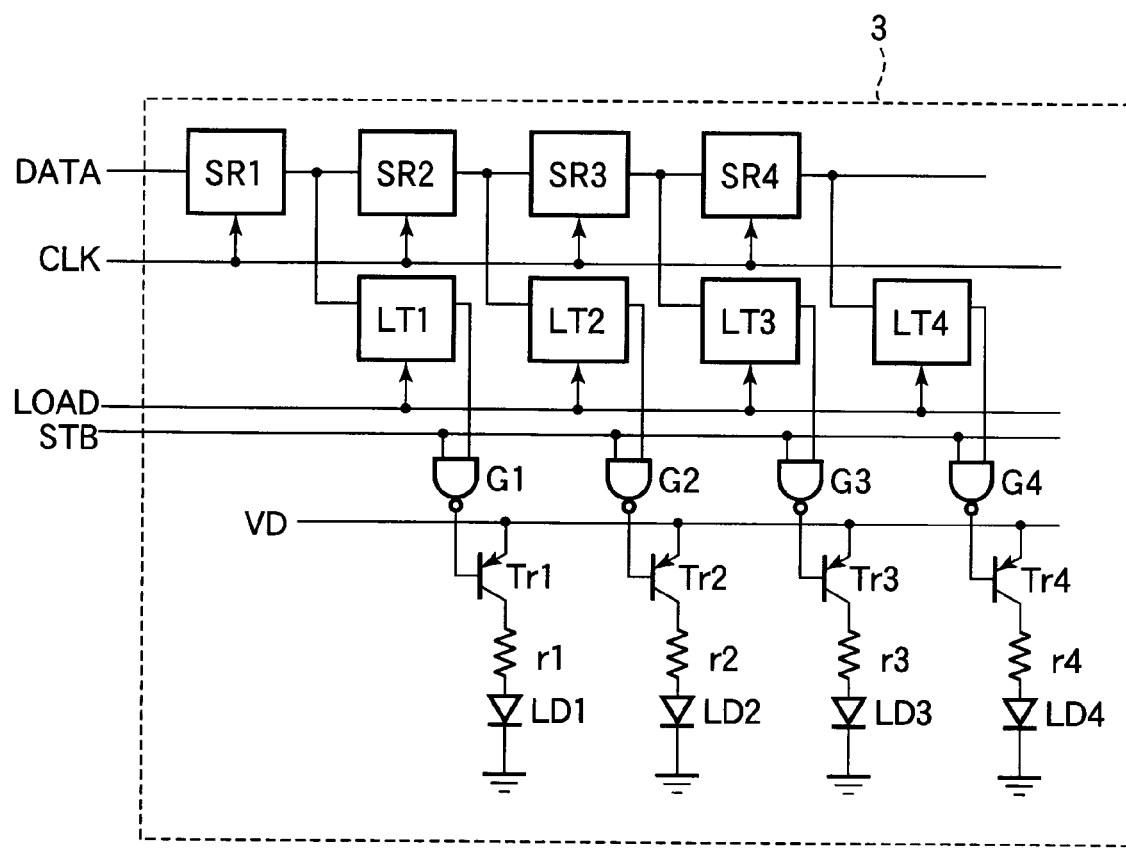
FIG. 4 is a block diagram, illustrating a drive circuit of the LED head for yellow.

The configuration of the LED head will be described. FIG. 4 is a block diagram, illustrating a drive circuit of the LED head 3Y for yellow.

As shown in FIG. 4, image data signal DATA is input together with clock signal CLK into the LED head 3Y. For example, the color printer 1 has the LED 3Y with a dot density of 300 DPI (dot per inch), and the image data DATA is a 2560-bit signal that is input as bit data serially into shift registers SR1-SR2560. Then, upon a latch signal LOAD, the bit data is output to latches LT-LT2560. Subsequently, the bit data of a high logic level is output from the latches LT1-LT2560 upon a strobe signal STB, so that light emitting elements LD1-LD2560 light up. G1-G256, Tr1-Tr256, and R1-R256 and VD denote gates, switching elements, protection resistors, and power supply, respectively.

The exposing process of the aforementioned LED head will be described. Referring to FIG. 1, the LED head 3Y includes an LED array, a circuit board on which drive ICs are mounted for driving the LED array, and a SELFOC LENS array that focuses the light emitted from the LED array on the surface of the photoconductive drum 6. The light emitting elements LDs 1-2560 are energized in accordance with an image signal for yellow and illuminate the charged surface of he photoconductive drum 6Y to form an electrostatic latent image of yellow. The yellow toner is deposited to the electrostatic latent image by the Coulomb force, thereby forming a yellow toner image. The transport belt 20 is sandwiched between the photoconductive drum 6Y and the transfer roller 4Y.

Likewise, the LED heads 3M, 3C, and 3K receive image signals for magenta, cyan, and black, respectively, so that magenta, cyan, and black toner images are formed just as in the LED head for yellow. The residual toner from the photoconductive drum 6Y is scraped off by the cleaning unit 15Y (one of the cleaning units 15C, 15M, 15K, and 15Y, referred to generally by number 15) and collected by a screw shaft, not shown, into a waste toner reservoir, not shown, located outside of the printing mechanism.

Referring to FIG. 1, the transport belt 20 is made of a semiconductive plastic film of a high electrical resistance and takes the forms of an endless belt mounted on a drive roller 30 and a driven roller 31. The transport belt 20 has an electrical resistance such that the print medium S can be electrostatically attracted to the belt 20 and the residual static electricity can be automatically neutralized after the print medium has left the belt 20. The drive rollers 30 is connected to a motor, not shown, and driven to rotate in a direction shown by arrow C. The upper half of the transport belt 20 is sandwiched between the photoconductive drums 6K, 6Y, 6M, and 6C and the transfer rollers 4K, 4M, and 4C.

A cleaning blade 33 presses the transport belt 20 so that the belt 20 is sandwiched between the drive roller 30 and cleaning blade 33. The cleaning blade 33 is formed of a flexible rubber material or a plastic material. The tip of the cleaning blade 33 is in pressure engagement with the transport belt 20 so as to scrape off the residual toner on the transport belt 20 into a waste toner tank 34.

The paper feeding mechanism will now be described. Referring to FIG. 1, the color printer 1 includes a paper feeding mechanism disposed at a right lower corner. The paper feeding mechanism includes a paper cassette 41, a hopping mechanism 40 and registry rollers 51 and 52. The paper cassette 41 includes a push-up plate 42, and an urging member 43. The hopping mechanism 40 includes a separator 44, a spring 45, and a feed roller 46 and is located at a paper outlet of the paper cassette 41. The hopping mechanism 40 picks up a sheet of paper S to feed it into guides 48 and 49 through which the paper S is fed to a first registry roller 51 and a second registry roller 52 that are in pressure contact with a transport roller 50.

An attraction roller 54 is in pressure contact with the driven roller 31, causing the paper S, advanced by the hopping mechanism 40 to a paper guide 53, to be charged so that the paper S is electrostatically attracted to the transport belt 20. The attraction roller 54 is formed of a high resistance, electrically semiconductive rubber material. Disposed between the attraction roller 54 and the image forming section for yellow is a photo sensor 55 that detects the leading edge of the paper S. The paper S may be advanced without having to employ the attraction roller 54.

The operation of the paper feeding mechanism will be described briefly. The paper S in the paper cassette 41 is urged by the push-up plate 42 against the separator 44. The separator serves to feed the paper S on a sheet by sheet basis. When the feed roller 46 is rotated by, a motor, not shown, in a direction shown by arrow F, the feed roller 46 and the separator 44 cause the paper S to advance into the guides 48 and 49 guide. Then, the paper S is pulled in between the transport roller 50 and the first registry roller 51. If the transport roller 50 is further rotated in a direction shown by arrow G, the paper S is guided from the second registry roller 52 through the paper guide 53, reaching a point between the attraction roller 54 and the transport belt 20. The color printer 1 includes a manual feed tray 56 that allows the user to feed paper manually. A photo sensor 58 detects the paper S that is fed manually. The manually fed paper S is directed between the attraction roller 54 and the transport belt 20 by the second registry roller 50 and second registry roller 52.

The attraction roller 54 is urged against the driven roller 31 and the driven roller 31 is grounded, so that the paper S can be attracted by the potential difference between the driven roller 31 and the attraction roller 54. The paper S is attracted to the transport belt 20 and advanced in the direction from right to left with reference to FIG. 1 so that a toner image is transferred. There is provided a neutralizer 60 over the drive roller 30, spaced apart by a predetermined distance. The neutralizer 60 neutralizes the paper S attracted to the transport belt 20 to set the paper free from the electrostatic force, thereby facilitating the release of the paper S from the transport belt 20. There is provided a photo sensor 61 to the left of the neutralizer 60, the photo sensor 61 detecting the trailing end of the paper S.

A paper guide 62 and a fixing unit 63 are disposed to the left of the neutralizer 60. The fixing unit 63 heats the paper S to fix the toner image on the paper S. The fixing unit 63 includes a heat roller 64 that heats the toner and a pressure roller 65 that rotates in contact with the heat roller 64. A cleaning pad 66 in the form of a felt is disposed on the fixing unit 63 to clean the surface of the heat roller 64 on which the toner is deposited. There is an exit to the left of the fixing unit 63. The paper S is discharged through the exit to a paper stacker 67. The paper stacker 67 holds the printed paper S thereon.

A control circuit that controls the operation of the tandem type printer of the aforementioned configuration will be described.

Figure 5:
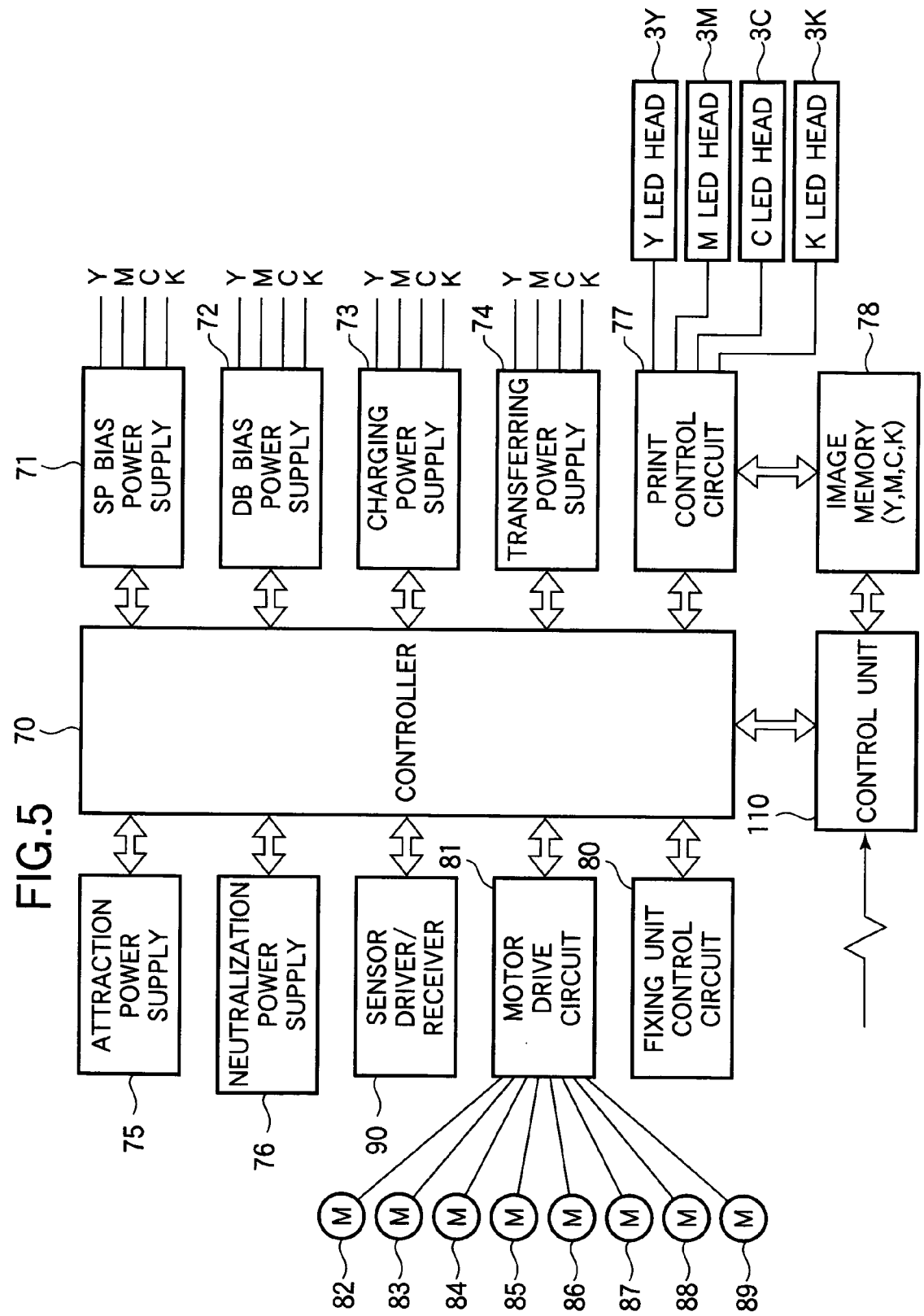
FIG. 5 is a block diagram that illustrates the configuration of the control circuit.

FIG. 5 is a block diagram that illustrates the configuration of the control circuit.

The references Y, M, C, K denote yellow, magenta, cyan, and black, respectively.

The controller 70 includes a microprocessor, ROM, RAM, timer, and I/O, and controls the overall operation of the color printer 1 in FIG. 1. The controller 70 is connected to an SP bias power supply 71, a DB bias power supply 72, a charging power supply 73, and a transferring power supply 74. The SP bias power supply 71 supplies electric power to the toner-supplying roller 27b in the form of an electrically conductive sponge roller. The DB bias power supply 72 supplies electric power to the developing rollers 27a. The charging power supply 73 supplies electric power to the charging roller 7. The transferring power supply supplies electric power to the transfer rollers 4C, 4M, 4Y, and 4K. The output voltages of the power supplies 71–74 are supplied to the printing mechanisms for yellow, magenta, cyan, and black, being switched on and off for individual colors.

The controller 70 is connected to an attraction charging power supply 75 that supplies electric power to the attraction roller 54, and a neutralization power supply 76 that supplies electric power to the neutralizer 60. The power supplies 75 and 76 are switched on and off under the control of the controller 70.

The controller 70 is connected to the LED heads 3K, 3Y, 3M, 3C, and 3K and the image memory 78 via a print control circuit 77. The print control circuit 77 controls the transfer of the print data and control data. The image memory 78 stores image data received from the host device through a control unit 110. In other words, the print control circuit 77 performs transfer of the print data that is supplied to the LED heads 3K, 3Y, 3M, and 3C and the time length of exposure of the LEDs, thereby forming an electrostatic latent image on the surface of the photoconductive drum 6. For example, the control unit 110 separates the image data, received from an external host device such as a host computer, into yellow image data, magenta image data, cyan image data, and black image data and then stores these items of image data into corresponding memory areas.

The fixing unit control circuit 80 drives a heater, not shown, in the heat roller 64 in the fixing unit 63 50 as to maintain the heat roller 64 at a predetermined temperature. The motor drive circuit 81 is connected to motors 82–89. The motors 82–85 drive the corresponding transfer rollers of the image forming sections 2K, 2Y, 2M, and 2C, respectively. The motor 87 drives the feed roller 46 and the transport roller 50. The motor 88 drives the fixing unit 63. The motor 89 causes the developing unit 2 to move into and out of contact engagement with the photoconductive drum 6.

The motors 82–89 are coupled via gears and belt, not shown, to corresponding driven elements.

The sensor driver/receiver 90 is connected to the controller 70. The sensor driver/receiver 90 drives the photo sensors 55, 58, and 61 in FIG. 1, and receives the signal waveforms outputted from the photo sensors 55, 58, and 61.

Figure 6:
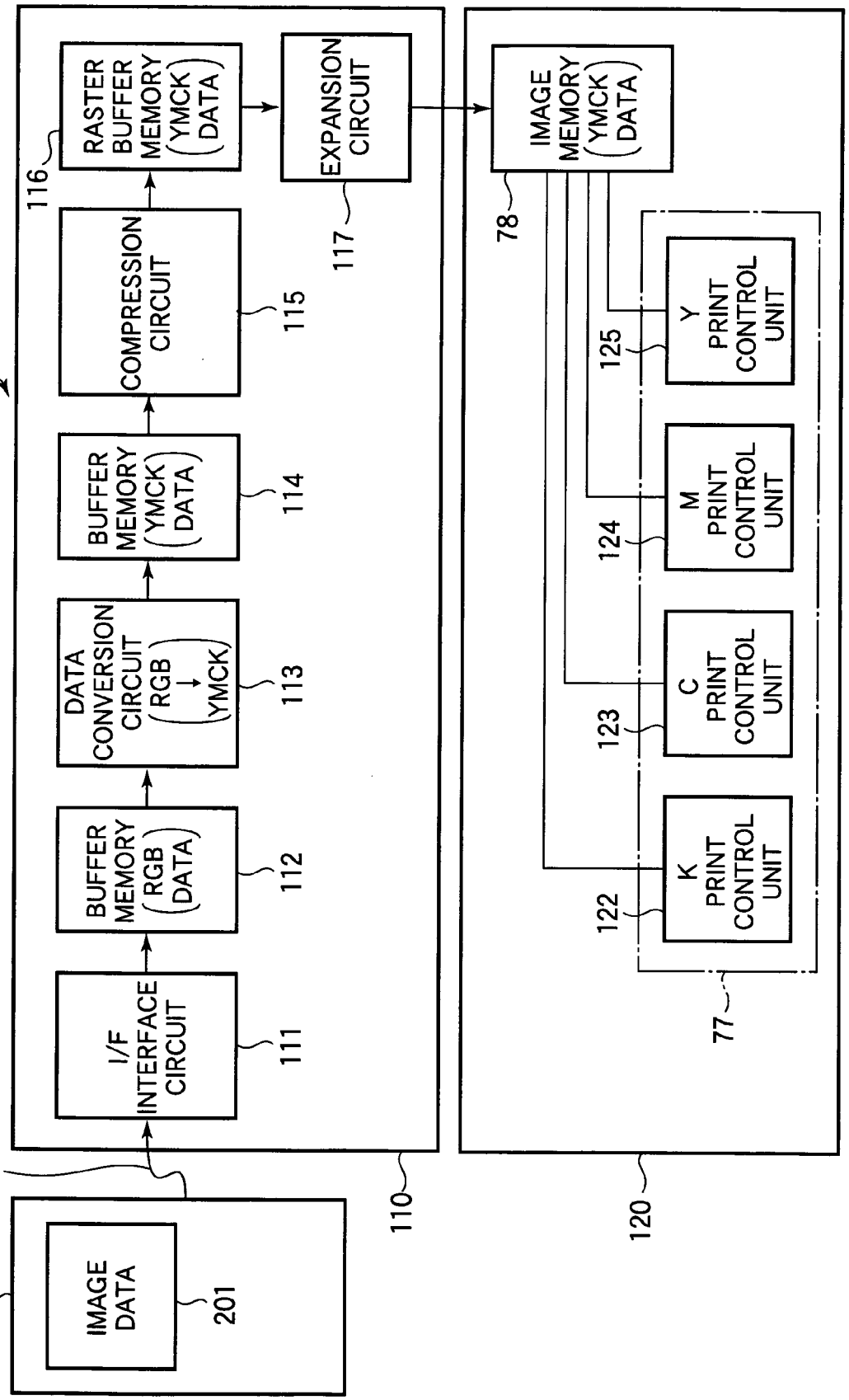
FIG. 6 is a block diagram, illustrating the configuration of an image data processing circuit for a tandem type color printer will be described.

FIG. 6 is a block diagram, illustrating the configuration of an image data processing circuit for a tandem type color printer will be described.

Referring to FIG. 6, the image data processing circuit (hereinafter referred to as processing circuit 100). Image data 201 is transmitted as RGB data from a host device 200 such as a personal computer. The processing circuit 100 includes the control unit 110 as a main controller and a printer unit 120.

With the processing circuit 100, the RGB data received via an interface (I/F) control circuit 111 is stored in the buffer memory 112. The buffer memory 112 is in turn connected to a data conversion circuit 113. The data conversion circuit 113 converts the RGB data into Y-, M-, C-, and K data, which in turn is stored in the buffer memory 114. The buffer memory 114 is connected to the raster buffer memory 116 via a compression circuit 115. The Y-, M-, C-, and K data in the buffer memory 114 is compressed by the compression circuit 115 stored into print data for each page in the raster buffer memory 116. The thus obtained Y-, M-, C-, and K data is then expanded by an expansion circuit 117 and then sent to the printer unit 120.

The Y-, M-, C-, and K data outputted to the printer unit 120 is then supplied as a video data, required for actual printing, to the print control units 122-125 for Y, M, C, and K. In other words, the Y-, M-, C-, and K data is stored into the image memory 78 in the printer unit 120 and then transferred as print data at predetermined timings to corresponding printing mechanisms. The print data is outputted in timed relation with the paper S being advanced along the transport path.

With the aforementioned color printer of the tandem type, the print control units 122–125 control corresponding printing mechanisms to perform exposing, developing, transferring, and fixing for four colors, so that toner images of four colors are formed on the same paper S. During printing, the printer unit 120 supplies the Y-, M-, C-, and K data to the corresponding print control units 122–125 simultaneously, and the corresponding printing mechanisms perform printing of the corresponding colors serially on the paper S. Only one of specific print control unit may be specified to operate, so that a toner image of only one color can be made, for example, monochrome printing.

Figure 7:
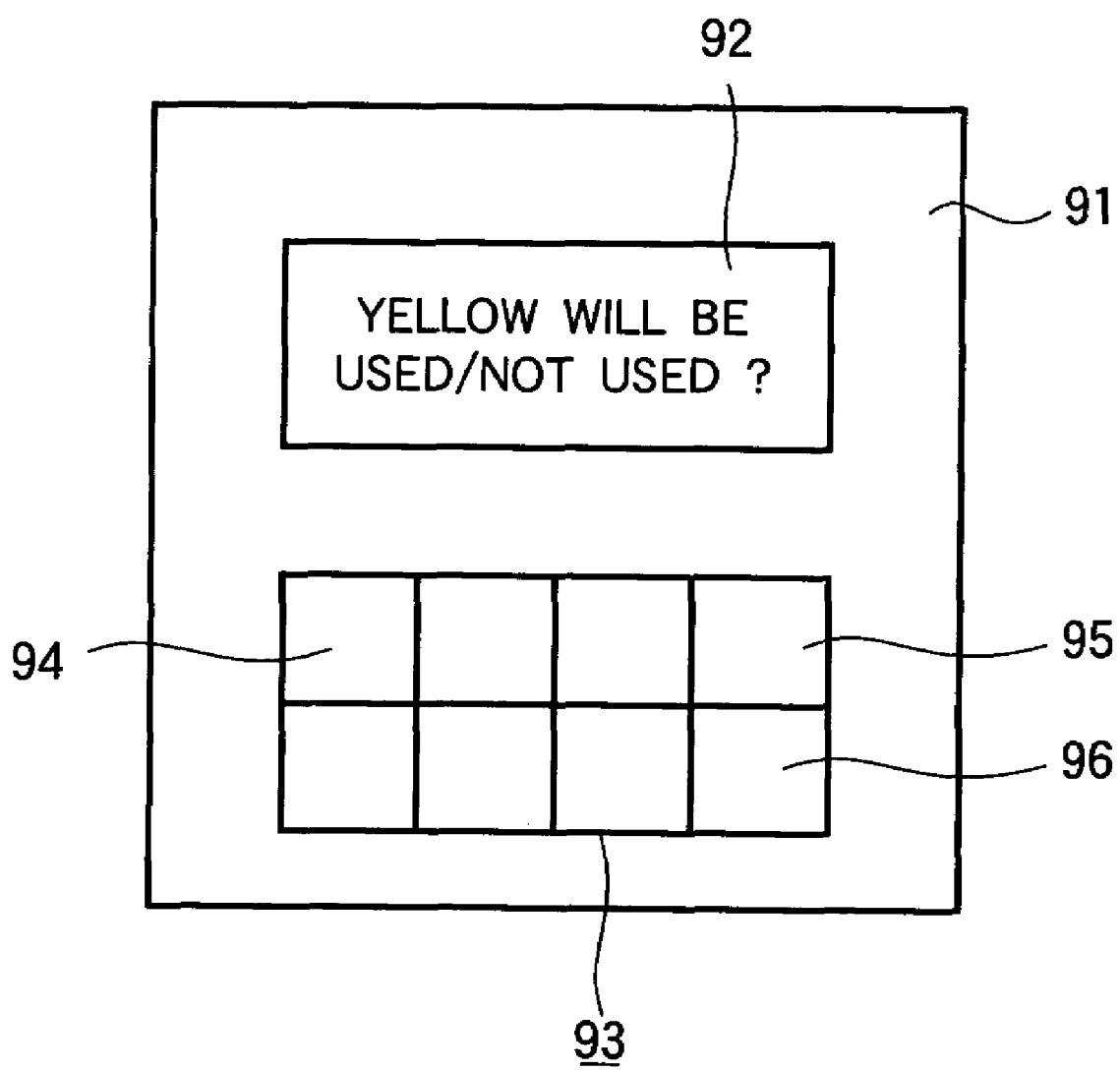
FIG. 7 illustrates the operation panel of the color printer according to the first embodiment.

FIG. 7 illustrates an operation panel of the color printer according to the first embodiment. Referring to FIG. 7, an operation panel 91 includes a display 92 and an operation key section 93. The key section 93 includes a setting key 94 for setting an operation mode, a specifying key 95 for specifying an image forming section 2 of a displayed color, a switching key 96 for switching the display on which an image forming section is displayed.

The controller 70 in FIG. 5 receives information specified by the specifying key 95, i.e., information on a printing mechanism to be operated. The received information is stored into an internal memory in the controller 70.

{Operation of Color Printer}

Next, the operation of the color printer according to the first embodiment will be described. Upon power up, the controller 70 causes the motor drive circuit 81 to operate, thereby performing initialization. Subsequently, the controller 70 controls the fixing motor 88 to drive the heat roller 64 in rotation, so that the cleaning pad 66 cleans the surface of the heat roller 64. Simultaneously, the controller 70 controls the fixing control circuit 80 for warm-up until the heat roller 64 reaches a predetermined temperature, thereby entering a printing mode. In the printing mode, the fixing control circuit 80 controls the heat roller 64 so that the heat roller 64 is maintained within a predetermined temperature range. If no printing is performed for a predetermined length of time, then the color printer 1 enters a sleep mode where electric power to the heat roller 64 is shut off in order to save power consumption. If a printing operation is commanded when the color printer 1 is in the sleep mode, the controller 70 enters a warm-up mode again and then returns to the print mode.

When the heat roller 64 reaches a predetermined temperature, the controller 70 causes the motor drive circuit 81 to drive the motor 87, thereby driving the drive roller 30 in rotation so that the transport belt 20 runs in a direction shown by arrow E. As a result, the cleaning blade 33 scrapes the residual toner and dust deposited on the surface of the transport belt 20 into the waste toner tank 34. When the transport belt 20 runs over a distance slightly longer than its one complete rotation, the motor 87 is stopped, thereby completing a cleaning operation. During the cleaning operation, the motors 82, 83, 84, and 85 in the printing mechanisms K, Y, M, and C are rotated, and the controller 70 causes the DB bias power supply 72, charging power supply 73, and SP bias power supply 71 to turn on for printing images of the respective colors. Thus, the predetermined voltages are applied to the charging roller 7, developing roller 27a, and the toner-supplying roller 27b, respectively. The cleaning blade 15C, 15M, 15Y, and 15K scrapes the residual toner from the photoconductive drum 6, thereby completing the cleaning operation.

If any one of the image-forming sections is absent from the color printer 1, the controller 70 does not perform an error handling operation but perform initialization. The user can open a printer cover to take out jammed paper and replace the image forming sections 2Y, 2M, 2C, and 2K. The initialization is also performed when the printer cover, not shown, of the color printer 1 is opened and subsequently closed.

After the initialization of the color printer 1, the control unit 110 waits for image data that will be supplied from an external host apparatus. After the initialization, the user specifies through the operation panel 91 an image section to be operated.

Referring to FIG. 7, the user specifies an operation mode using the setting key 94. First, a message "Yellow will be used/not used?" is displayed. If yellow is to be used, then the user depresses the setting key 95. Then, upon depressing the switching key 96, a message "Magenta will be used/not used?" is displayed. If yellow is not to be used, then the user depresses the switching key 96. Likewise, the user operates the setting key 95 and/or switching key 96 to select colors of the displayed messages for cyan and black.

The controller 70 receives information on an image forming section to be used from the operation panel 91, and stores this information into the internal memory therein.

When the host computer sends the image data to the control unit 110, the controller 70 outputs a command to the control unit 110 and the memory areas in the image memory 78. The control unit 110 separates the image data into data of individual colors in response to the command. The image memory 78 stores the image data of the respective colors into its corresponding memory areas.

Figure 8:
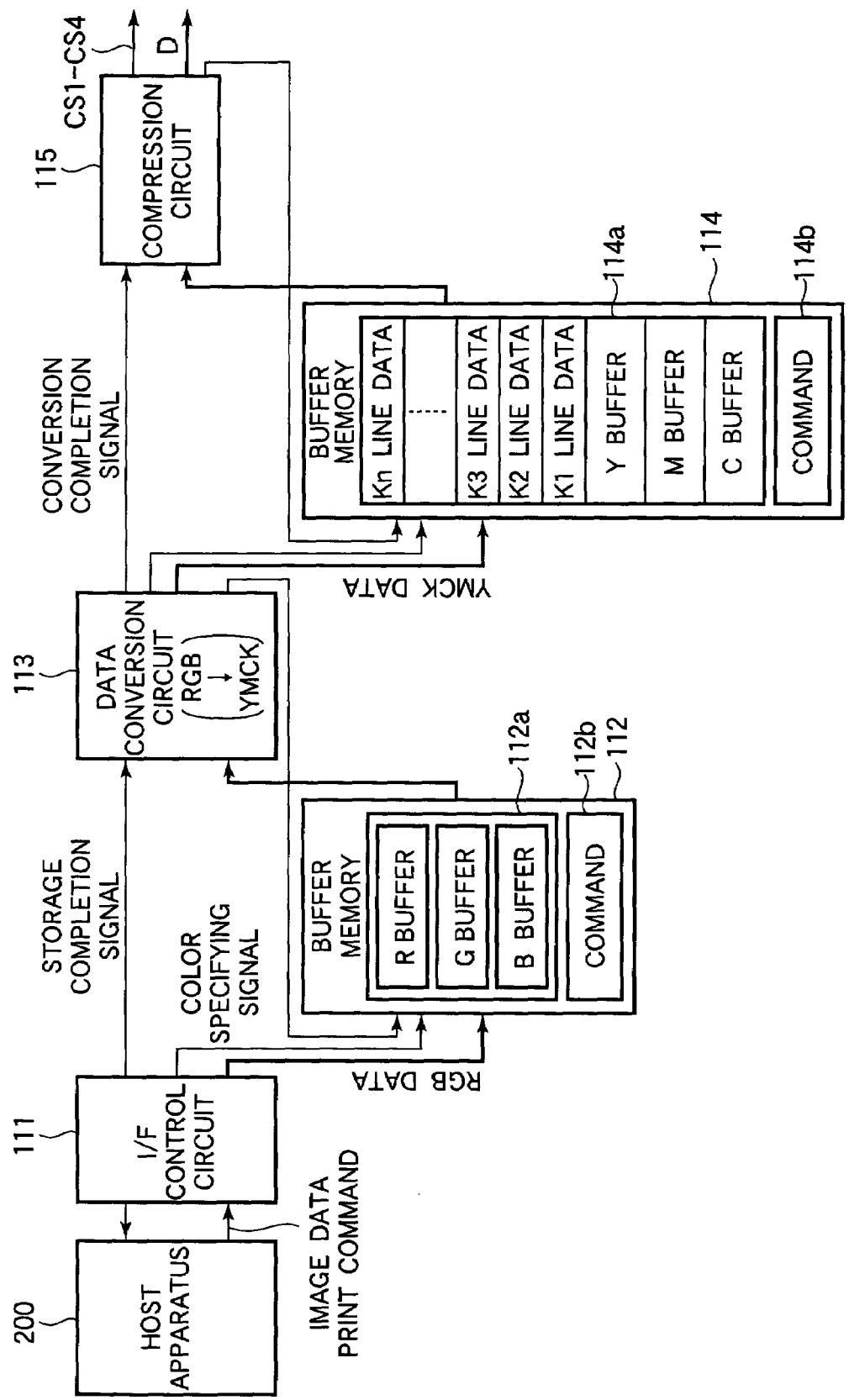
FIG. 8 is a block diagram, illustrating the flow of signals in the image data processing circuit of the control unit.

FIG. 8 is a block diagram, illustrating the flow of signals in the control unit 110 of the processing circuit 100. Elements in FIG. 8 similar to those in FIG. 6 have been given the same reference numerals.

Referring to FIG. 8, the I/F control circuit 111 is connected to the host apparatus 200 and receives a print command and image data from the host apparatus 200. Based on these input signals, the I/F control circuit 111 outputs RGB data (thick lines) and print commands (thin lines). The print commands include a color specifying signal and a storage completion signal. The color-specifying signal indicates whether the image is a full color image or a mono color image. The buffer memory 112 has a data storage area 112a in which the RGB data is stored and a command storage area 112b in which the associated commands are stored.

The I/F control circuit 111 analyzes the commands and data received from the host apparatus 200 to generate the color specifying signal, and then stores the commands into the command area 112b and the data into R buffer, G buffer, and B buffer in sequence. When the I/F control circuit 111 has stored one page of image data received from the host apparatus 200, the I/F control circuit 111 outputs the storage completion signal to the data converting circuit 113.

Upon receiving the storage completion signal from the I/F control circuit 111, the data converting circuit 113 converts the RGB data into the Y-, M-, C-, and K data. In other words, the data converting circuit 113 receives the RGB data on a line-by-line basis from the buffer memory 112b and converts the RGB data into the Y-, M-, C-, and K data, which will be stored into the buffer memory 114 subsequently. Just as the buffer 112, the buffer memory 114 includes a data storage area 114a in which data for the respective colors is stored and a command storage area 114b in which commands are stored. The buffer 112 has start addresses for the RGB data of respective colors. The data converting circuit 113 generates addresses of areas corresponding to the respective colors from the start addresses to read the RGB data from the buffer 112 on a line-by-line basis, while at the same time generating addresses of areas corresponding to the respective colors from the start addresses to store the Y-, M-, C-, and K data into the data storage area 114a of the buffer 114 on a line-by-line basis.

When the buffer 114 receives a total of m lines of one page of the respective Y-, M-, C-, and K data, the data converting circuit 113 provides the conversion completion signal to a compressing circuit 115. Upon receiving the conversion completion signal, the compression circuit 115 initiates a compression process. In this compression process, the first line (K1 line data) to the final line (Kn line data) of a black image are first compressed. Then, the first line (Y1 line data) to the final line (Yn line data) of a yellow image are compressed. Then the first line (M1 line data) to the final line (Mm line data) of a magenta image are compressed. Then the first line (C1 line data) to the final line (Cn line data) of cyan image data are compressed. Every time compression of one line data completes, the compressed data is output to a raster buffer memory 116.

When a total of n lines of data for one page of each of 4 colors has been stored into a line data storage area of the raster buffer 116, the image data expanded by an expansion circuit 117 is transferred as video data from the control unit 110 in FIG. 6 to the image memory 78 of the printer unit 120, and stored in the image memory 78.

The controller 70 makes a decision based on the information stored in the internal memory in the controller 70, i.e., information on an image forming section to be used, to determine whether the image data should be transmitted to the printer unit 120. In other words, the image data of a specified color is transferred as video data to the image memory 78 of the printer unit 120 and the image data of non-specified color is not transmitted to the printer unit 120. The controller 70 drives the motor (one of 82–85) of an image forming section of a specified color and does not drive the motor (one of 82–85) of an image forming section of a non-specified color.

When the color specifying signal indicates that received data contains a color not specified by the user, the controller 70 does not transmit the non-specified image data to the printer unit 120 and nor does it drive the motor of that image forming section. Then, the controller 70 causes a mechanism, not shown, to maintain a non-specified image forming section away from the transport belt 20 during a printing operation with a specified color.

The printing operation of image data of a specified color will be described. The controller 70 controls the motor drive circuit 81 to drive the motor 86, thereby driving the feed roller 46. The feed roller 46 rotates to feed one page of paper S from the paper cassette 41 to the guides 48 and 49. At the same time, the motor drive circuit 81 controls the motor to rotate so that the leading edge of the paper S abuts the nip between the transport roller 50 and the first registry roller 51 and then has some slack in it. This slack is used to eliminate the skew of the paper S.

The controller 70 causes the motor drive circuit 81 to drive a corresponding one of the motors 81–88, thereby rotating the photoconductive drum 6 in the corresponding image forming section 2, charging roller 7, developing roller and sponge roller in developing unit 2, transfer roller 4C, 4M, 4Y and 4K, drive roller 30, transport roller 50, and heat roller 64 of the fixing unit 63. At the same time, the controller 70 turns on the charging power supply 73, developing bias power supply 72, and SP bias power supply 71 to supply voltages to the charging roller 7, DB roller 27a, and SB roller 27b of a corresponding image forming section 2. Thus, the surfaces of the photoconductive drums of corresponding image-forming sections 2 are uniformly charged by corresponding charging rollers 7. The DB rollers 27a and SB rollers 27b are also charged to predetermined high voltages.

When the transport roller 50 is rotated in a direction shown by arrow G, the paper S is transported by the first registry roller 51 and the second registry roller 52 to the guide 53. Then, as soon as the leading edge of the paper S reaches between the attraction roller 54 and the transport belt 20, the controller 70 turns on the attraction charging power supply 75, which in turn supplies a voltage to the attraction roller 54. Thus, the leading edge of the paper S is attracted to the transport belt 20 by the Coulomb force between the attraction roller 54 and the drive roller 31.

When the transport roller 50 rotate in the direction shown by arrow G, the paper S is attracted to the transport belt 20 and transported by the transport belt 20 in the direction shown by arrow E. When the photo interrupter 55 detects the leading edge of the paper S, the photo interrupter 55 sends a detection signal to the controller 70 via a sensor receiver/driver 90. When the trailing end of the paper S passes the feed roller 46, the controller 70 causes the motor drive circuit 81 to stop the motor 86 in response to the detection signal from the separator 44.

A predetermined time length after the transport roller 50 begins to rotate, the print control circuit 77 sends a command to the image memory 78 that stores image data therein. Upon the command, the image memory 78 transmits one line of image data of a specified color to the print control circuit 77. In response to the command from the controller 70, the print controller 77 converts one line of image data of a specified color into a signal format that can be transmitted to the LED head 3, then sends the data to the LED head 3. The LED head 3 drives LEDs in accordance with the image data received from the print controller 77, thereby forming an electrostatic latent image of one line of the image data on the charged surface of the photoconductive drum 6. The image forming section 2 holds toner of a corresponding color so that the DB roller 27a applies charged toner of a specified color to the electrostatic latent image formed on the photoconductive drum 6.

Thereafter, when the leading edge of the paper S reaches between the photoconductive drum 6 and transfer roller 4C, 4M, 4Y and 4K, the controller 70 turns on the transfer power supply 74 so that the toner image on the photoconductive drum 6 is electrostatically transferred by the transfer roller 4 onto the paper S. As the photoconductive drum 6 rotates, the toner image for one page is transferred onto the paper S. This completes the transfer of a toner image of a specified color onto the paper S.

The paper S further advances as the transfer belt 20 runs further, so that a toner image of another color, if any, is transferred onto the paper S in registration with a previously transferred toner image. In other words, the controller 70 causes the image memory 78 to output one line of image data of another color to the print control circuit 77. In response to a command from the controller 70, the print control circuit 77 converts one line of image data of the color into a signal of an appropriate format that can be transmitted to the LED head 3 and transmits the converted signal to the LED head 3. The LEDs in the LED head 3 corresponding to the image data are lit to form an electrostatic latent image for one line on the charged surface of the photoconductive drum 6. In this manner, the LED head 3 receives lines of image data of the color from the image memory 78 and forms electrostatic latent image for one page. Likewise, the operation is performed for all other colors. Detailed description thereof is omitted.

The paper S is then further advanced for the transfer of toner images of other colors, if any. After toner images of all specified colors have been transferred onto the paper S, the paper S is transported by the transport belt 20 to a neutralizer 60. Then, the controller 70 turns on the neutralizing power supply 76 to neutralize the paper S. The charge on the paper S is dissipated by neutralization and the paper S becomes easy to leave the transport belt 20, so that the paper S leaves the transport belt 20 above the drive roller 30 and is guided by a paper guide 62 into the fixing unit 63. As soon as the paper S leaves the neutralizer 60, the controller 70 turns off the neutralizing power supply 76.

The toner image on the paper S is pulled in between the heat roller 64 and the pressure roller 65 for fixing. When the fixing completes, the paper S is discharged to the paper stacker 67. When the photo interrupter 61 detects the trailing edge of the paper S, the controller 70 determines that the paper S has been discharged. If no paper S is transported subsequently after the discharge of the paper S, the controller 70 causes the motor drive circuit 81 to stop the motors 87 and 88. Then, the controller 70 turns off the charging power supply 73, SP bias power supply 71, and DB bias power supply 72. The image forming section 2 of a color not specified is returned by a mechanism, not shown, from the position away from the transport belt 20 to the position where the image forming section can perform printing normally.

As described above, the paper S is advanced by the paper feeding mechanism 40 and an image of a specified color is printed on the paper S. Likewise, a color image can also be printed on the paper S fed from the manual feed tray 56.

As described above, only image forming sections specified by the user are operated to print images of specified colors, thereby saving consumable toner of colors not specified. This allows reduction of running cost of the image forming apparatus 1.

SECOND EMBODIMENT

Figure 9:
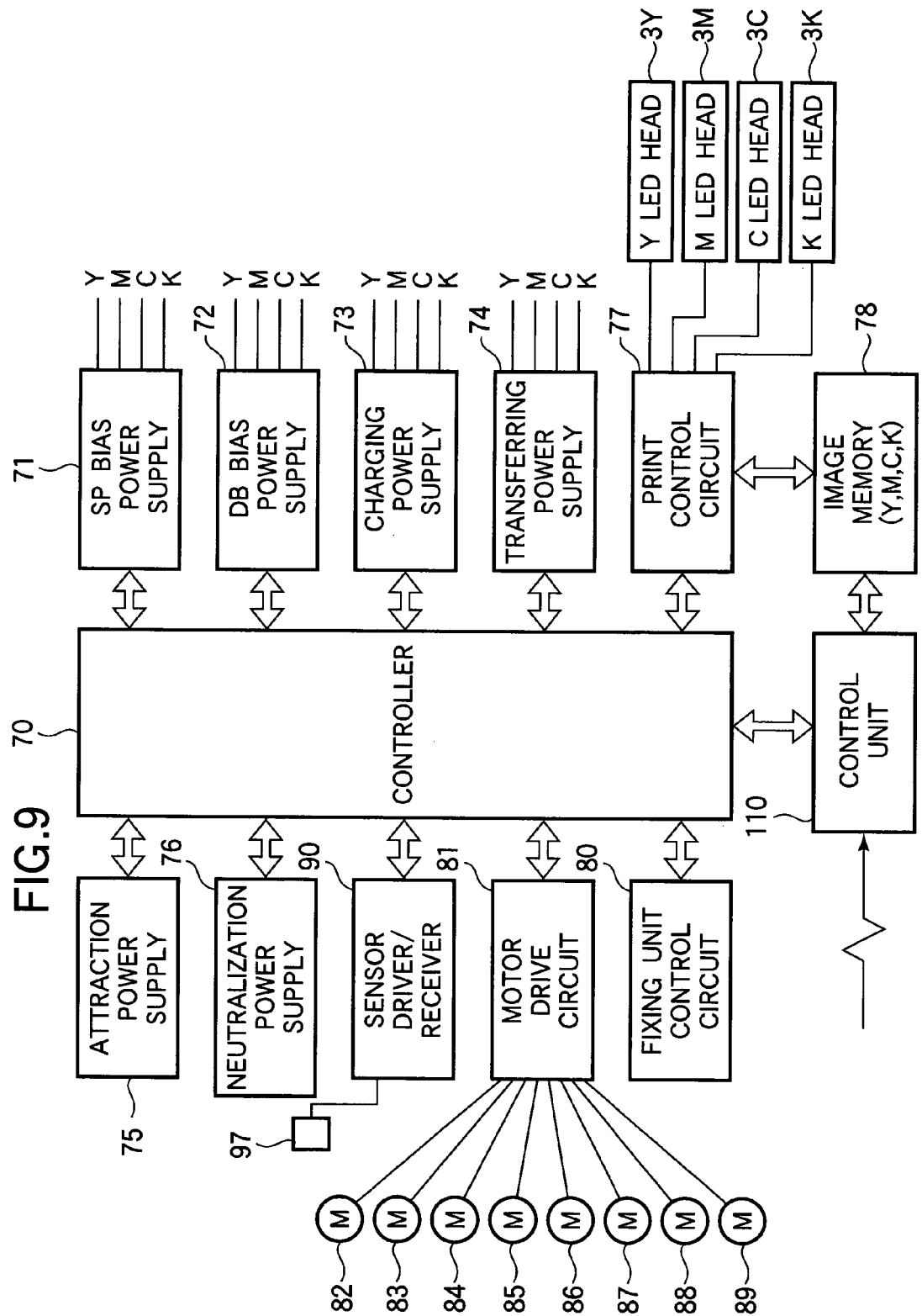
FIG. 9 is a block diagram of a printer according to a second embodiment.

FIG. 9 is a block diagram of a printer according to a second embodiment.

Referring to FIG. 9, a sensor driver/receiver 90 is connected to a remaining toner sensor 97 which will be described later. The remaining toner sensor 97 is used to detect an amount of toner that remains in the developing unit. The remaining toner sensor 97 also detects whether image-forming sections are attached to the image forming apparatus 1. The output of the remaining toner sensor 97 is sent to the controller 70.

Figure 10:
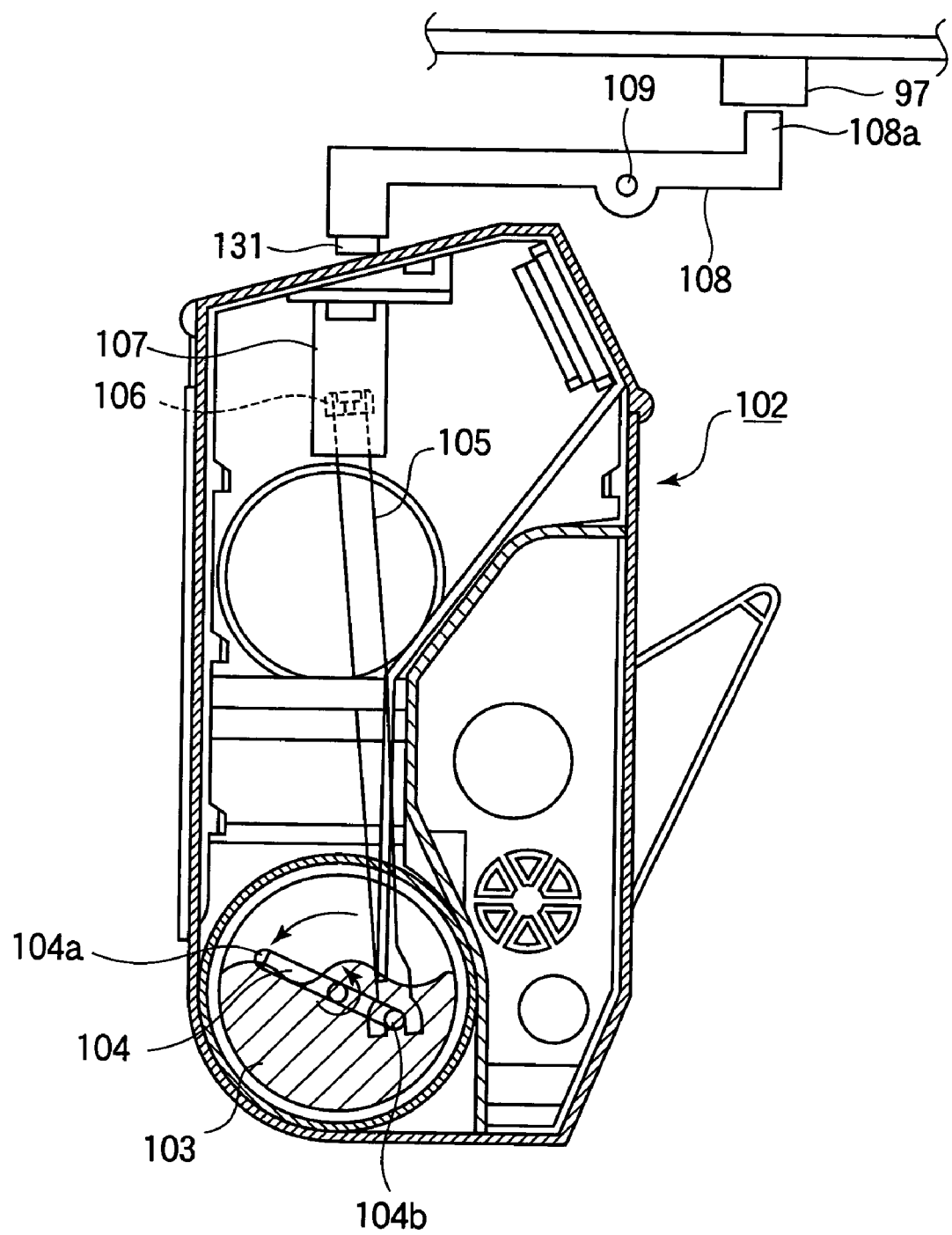
FIG. 10 illustrates a toner cartridge of the printer according to the second embodiment.

FIG. 10 illustrates a toner cartridge of the printer according to the second embodiment.

Referring to FIG. 10, a toner cartridge 102 has a toner chamber 103. The toner chamber 103 incorporates a rotating agitator 104. The agitator 104 is formed in the shape of a crank shaft having one crank portion 104a that rotates to agitate the toner, and another crank portion 104b rotatably coupled to a coupling bar 105. The coupling bar 105 moves up and down as the agitator 104 rotates. A magnetic body 106 is attached to the upper end of the coupling bar 105. The upper end of the coupling bar 105 is guided its vertical movement by a guide 107.

A sensor lever 108 is pivotally mounted on a fulcrum 109 provided over the toner cartridge 102. The sensor lever 108 has a permanent magnet 131 on one longitudinal end and an interrupter 108a formed on another longitudinal end. When the coupling bar 105 moves upward, the magnetic body 106 is attracted to the permanent magnet 131 so that the sensor lever 108 pivots counterclockwise in FIG. 10. The counterclockwise rotation of the sensor lever 108 causes the interrupter 108a to move into the remaining toner sensor 97.

When the crank portion 104a of the agitator 104 is at a lower position, the magnetic body 106 is at an upper position so that the magnetic body 106 attracts the permanent magnet 131 to cause the remaining toner sensor 97 to detect the interrupter 108a. The remaining amount of toner can be detected in terms of the time length during which the magnetic body 106 remains attracted to the permanent magnet 131. If the toner cartridge 102 is not attached to the image forming apparatus 1, the permanent magnet 131 is not attracted. Therefore, the remaining toner sensor 97 remains off. The controller 70 detects that the remaining toner sensor 97 is off, thereby detecting whether the image forming section 2 has been attached in position. The rest of the construction of the second embodiment is the same as the first embodiment.

The operation of the second embodiment will be described.

Figure 11:
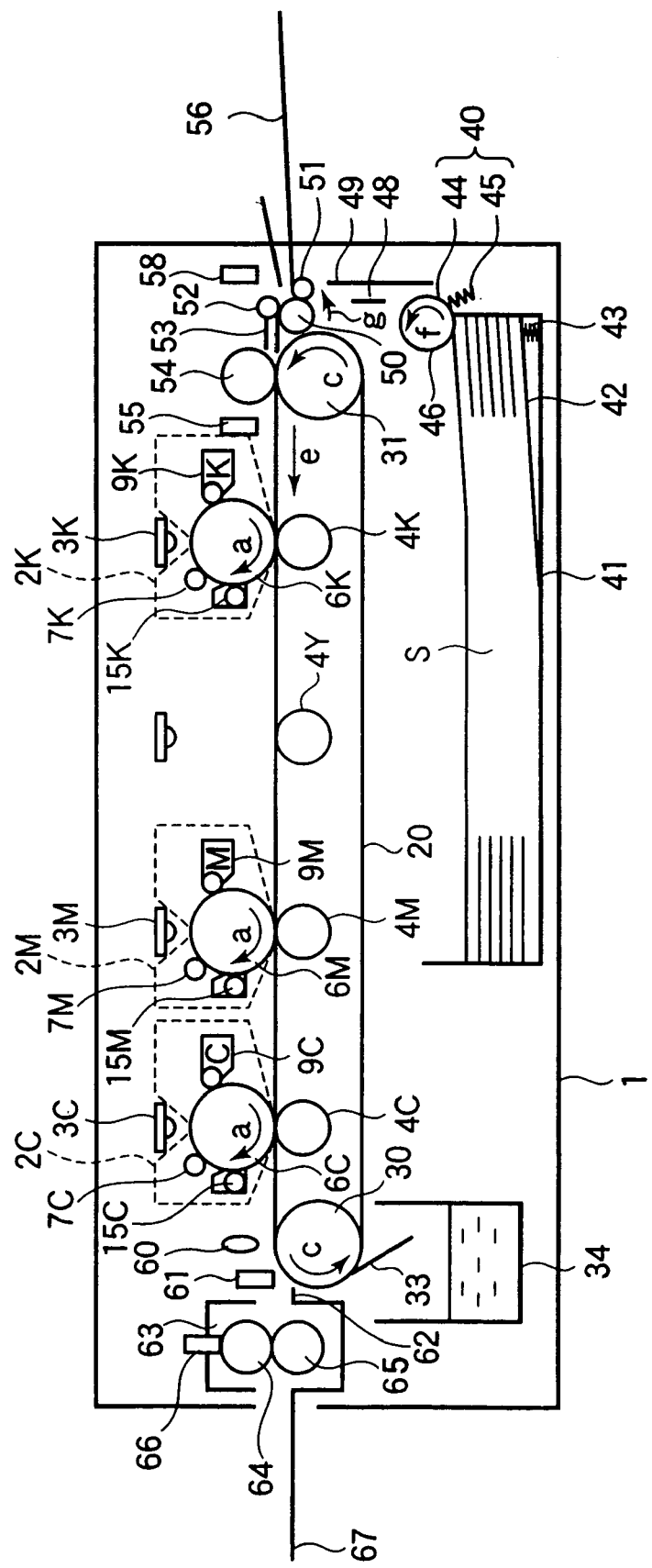
FIG. 11 illustrates the printer when the image forming section for yellow has been detached.

FIG. 11 illustrates the printer 1 when the image forming section 2Y for yellow has been detached. It is assumed that the image forming section 2Y for yellow has been detached from the image forming apparatus 1 as shown in FIG. 11.

Just as in the first embodiment, when the color printer 1 completes its initialization, the controller 70 waits for image data that will be received from an external host apparatus through the control unit 110. The operator specifies an image forming section through the operation panel 91 in FIG. 7. During the initialization, the remaining toner sensor 97 in FIG. 10 outputs to the controller 70 the information on the image forming section 2 that is absent from the color printer 1.

The controller 70 receives from the operation panel 91 the information on an image forming section to be used. The controller 70 stores this information in a memory therein.

When the control unit 110 receives image data from the host computer, the controller 70 outputs commands to the control unit 110 and image memory 78, the commands instructing separation of the image data into the respective colors. As described previously, the image memory 78 stores image data of the respective colors for one page of the paper S.

The image data separated into the respective colors is processed as mentioned above, and transferred as video data from the control unit 110 in FIG. 6 to the image memory 78 of the printer unit 120, which in turn stores the video data therein.

The controller 70 selects an image forming section to be operated based on the information stored in the internal memory of the controller 70, i.e., the information on an image forming section to be used and the information from the remaining toner sensor 97. The controller 70 causes an image forming section to operate, the image forming section corresponding to a specified color and having been detected by the remaining toner sensor 97. For image forming sections that are specified but not attached, the image data for these image forming sections is not transmitted to the printer unit 120, the corresponding motors are not driven, and an error handling operation is performed. For example, if the operator specifies yellow but the image forming section for yellow is not attached to the printer 1 (FIG. 10), then the image data of yellow is not transmitted to the printer unit 120 nor is the motor for the image-forming section 2Y driven in rotation.

If the color specifying signal indicates that the data received contains a color not specified by the user, the controller 70 does not allow the operation of the image forming section corresponding to the color not specified by the user. For the image forming sections of colors specified by the operator and attached to the printer, printing is performed as described in the first embodiment.

In addition, a transfer voltage is applied to the transfer roller 4C, 4M, 4Y and 4K corresponding to the image forming section 2C, 2M, 2Y and 2K that is not attached to the printer, thereby minimizing leakage of current occurring when the paper S passes between adjacent the image forming sections 2C, 2M, 2Y and 2K. Thus, printing quality can be as good as when all the image forming sections are attached.

In the second embodiment, when the image forming section 2C, 2M, 2Y and 2K absent from the printer is specified, the error handling operation is carried out. This allows the operator to check the problem before printing, preventing failure of printing.

When it is determined that image forming sections specified by the operator have not been attached to the printer 1, a message may be displayed which indicates to the operator that desired image forming sections 2C, 2M, 2Y and 2K are not attached. Of course, an exclusive sensor may be provided in order to detect the presence and absence of the image forming sections. However, the remaining toner sensor 97 may be conveniently used to detect the presence and absence of the image forming sections in the printer 1, thereby eliminating the need for a separate sensor.

THIRD EMBODIMENT

A printer according to a third embodiment incorporates a means for detecting the presence and absence of the image forming sections just as in the second embodiment. This allows image-forming sections of specified colors to perform printing as well as image forming sections of non-specified colors to perform printing if they are attached to the printer.

The operation of the third embodiment will be described. It is assumed that the image forming section 2Y of yellow has been detached from the printer 1 (FIG. 11) and the operator specifies black.

Just as in the first embodiment, upon completion of initialization of the color printer 1, the printer 1 waits for image data, which will be sent from the host apparatus through the interface 111. The operator specifies image-forming sections to be operated through the operation panel 91 in FIG. 7. During initialization, the remaining toner sensor 97 (FIG. 10) sends information on a corresponding image forming section. That is, remaining sensors send information representing that each of the image forming sections 2K, 2M, and 2C for black, magenta, and cyan have been attached to the printer 1. The information on an image forming section to be used is sent from the operation panel 91 to the controller 70, which in turn stores the information into the internal memory therein.

When the control unit 110 receives the image data from the host computer, the controller 70 provides a command for separating the image data into the respective colors to the control unit 110 and the memory areas of the image memory 78. As described previously, the image memory 78 stores one page of image data of the respective colors.

The image data separated into the respective colors is then subjected to the aforementioned processing before being transferred from the control unit 110 to the image memory 78 of the printer unit 120 in FIG. 6 and stored into the image memory 78.

The controller 70 determines image forming sections to be operated based on the information stored in the internal memory of the controller 70, (i.e., image forming sections of specified colors) and the information from the remaining toner sensor 97. The controller 70 causes the image forming sections of the specified colors to operate, the image forming sections having been detected by the corresponding remaining toner sensors 97. In this case, the controller 70 causes the image forming section 2K of black to operate. Also, the controller 70 allows operation of the image-forming section not specified but detected by the remaining toner sensors 97. That is, if image data for the image forming sections of magenta, and cyan exist, the controller 70 allows these image-forming sections 2M and 2C to print.

In the third embodiment, printing is not performed for an image forming section specified but not detected by the corresponding remaining toner sensor 97. For image forming sections not specified but detected by the corresponding remaining toner sensor 97, the image data is not sent to the printer unit 120 and the motor for that image forming section is not driven. Moreover, the image forming section is moved away from the transport belt 20. If an image forming section is not detected, a transfer voltage is applied to the transfer roller for the image forming section 2C, 2M, 2Y and 2K so as to prevent leakage current.

The printing operation of the image forming sections detached from the printer 1 is the same as the first embodiment. The third embodiment is advantageous in that image-forming sections detected but not specified are operated to perform printing without specifying them.

FOURTH EMBODIMENT

A printer according to a fourth embodiment has a means for detecting the presence and absence of an image forming section just as in the second embodiment, and image data of a color not to be printed is not processed. The fourth embodiment has the same configuration as the second embodiment.

The operation of the fourth embodiment will be described. It is assumed that the image forming section 2Y for yellow has been detached from the printer 1 (FIG. 11) and the operator specifies the image forming section for black.

Just as in the second embodiment, when the initialization of the color printer 1 completes, the controller 70 waits for image data, which will be received from an external host apparatus through the interface 111. The operator specifies an image forming section to be used via the operation panel 91 in FIG. 7. During initialization, the remaining toner sensor 97 in FIG. 10 transmits the information on an image forming section not attached to the printer 1 to the controller 70.

The information on an image forming section to be used is sent from the operation panel 91 to the controller 70. The controller 70 in turn stores this information into the internal memory of the controller 70.

When the control unit 110 receives image data from the host computer, the controller 70 outputs commands for separating the image data into the respective colors to the control unit 110 and the respective memory areas of the image memory 78. That is, the data converting circuit 113 in FIG. 8 converts RGB data into YMCK data. In response to the command from the controller 70, the data converting circuit 113 selects image data to be further processed based on the information on the image forming sections to be used and information from the remaining toner sensor 97.

The image data for an image forming section, which has been attached to the printer 1 and corresponds to a color specified by the operator, is subjected to the subsequent processing and then transferred as video data from the control unit 110 (FIG. 6) to the image memory 78.

If a color is specified but a corresponding image forming section is not detected, the image data of the color is not stored in the receiving buffer 114.

In this manner, after the image data is converted into the respective colors, the image data not to be printed is not processed any further, thereby saving the overall processing time as well as allowing the memory areas to be used for other purposes. The aforementioned first and third embodiment may be configured in such a way that the image data of colors not to be printed is not processed any further after the image data of the respective colors is converted.

FIFTH EMBODIMENT

In a fifth embodiment, there is provided a detecting means for detecting that image forming sections have been attached to the printer 1, and the image forming sections attached to the printer 1 perform printing. The fifth embodiment has the same configuration as the second embodiment except for the operation panel 91 in FIG. 7.

The operation of the fifth embodiment will be described. It is assumed that the image forming apparatus 2Y of yellow has been detached from the printer 1 (FIG. 11) and the operator specifies back printing.

During the initialization, the information on image forming sections not attached to the printer 1 is transmitted from corresponding remaining toner sensors 97 to the controller 70.

When the control unit 110 receives image data from the host computer, the controller 70 outputs commands for separating the image data into the respective colors to the control unit 110 and the memory areas in the image memory 78. That is, the data converting circuit 113 in FIG. 8 converts the RGB data into Y-, M-, C-, and K data. In response to the command from the controller 70, the data converting circuit 113 selects image data to be printed according to the information on the image forming sections to be used and information from the remaining toner sensor 97.

The controller 70 causes the image forming sections detected by the corresponding remaining toner sensor 97 to operate. Image data for image forming sections not detected is not transmitted to the printer unit 120, the motor for the image forming sections are not driven, and error handling is performed. For example, if the image forming section of yellow is not attached (FIG. 11), the image data of yellow is not transmitted to the printer unit 120 nor is the motor of the image forming section 2Y of yellow driven.

According to the fifth embodiment, the means for detecting the presence and absence of the image forming sections allows only attached image forming sections to perform printing without providing a memory section or a specifying means that specifies image forming sections to be used. Therefore, an inexpensive printer can be provided.

Even if some image-forming sections have not been attached to the printer 1, printing can be performed only with the image forming sections attached to the printer 1, thereby not avoiding waste of the consumable items of image forming sections not to be operated. This saves the running costs of the printer.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A printing apparatus including a plurality of image forming sections that are removably attached to a body of the printing apparatus, each one of the image forming sections being capable of forming an image of a respective color independently from the other image forming sections; the printing apparatus comprising:

a plurality of transfer sections each of which opposes a corresponding one of the plurality of image forming sections;

a transporting section that transports a recording medium through the plurality of image forming sections;

a power supply that supplies a transfer voltage to said plurality of transfer sections;

a specifying unit that specifies an image forming section that performs printing;

a control unit that controls the image forming section specified by said specifying unit to operate to form an image of a corresponding color, said control section controlling said power supplying section in such a way that said power supplying section supplies the transfer voltage not only to a transfer section corresponding to the image forming section specified by said specifying unit but also to a transfer section corresponding to an image forming section not specified by said specifying unit.

2. The printing apparatus according to claim 1, wherein when if print data contains a color corresponding to an image forming section not specified by said specifying unit, said control unit performs control in such a way that only print data for a color corresponding to the specified image forming section is processed in a format that can be printed.

3. The printing apparatus according to claim 1, wherein each of the image forming sections comprises a respective photoconductive drum.

4. A printing apparatus including a plurality of image forming sections that are removably attached to a body of the printing apparatus, each one of the image forming sections being capable of forming an image of a respective color independently from the other image forming sections; the printing apparatus comprising:
  a plurality of transfer sections each of which opposes a corresponding one of the plurality of image forming sections;
  a transporting section that transports a recording medium through the plurality of image forming sections;
  a power supply that supplies a transfer voltage to all of said plurality of transfer sections;
  a plurality of detectors that detect the presence and absence of corresponding image forming sections in the body; and
  a control unit selectively controls the image forming sections to operate according to detection results of said plurality of detectors, said control section controlling said power supplying section in such a way that said power supplying section supplies the transfer voltage not only to a transfer section corresponding to an image forming section detected by a corresponding one of said plurality of detectors but also to a transfer section corresponding to an image forming section not detected by a corresponding one of said plurality of detectors.

5. The printing apparatus according to claim 4, wherein said control unit controls a detected image forming section to operate, and said control unit does not control a non-detected image forming section to operate.

6. The printing apparatus according to claim 4, wherein each of the image forming sections comprises a respective photoconductive drum.

7. A printing apparatus having a plurality of image forming sections that are removably attached to a body of the printing apparatus and form images of different colors, the printing apparatus comprising:
  a plurality of detectors that detect the presence end absence of corresponding image forming sections in the body; and
  a control unit that selectively controls the image forming sections to operate according to detection results of said plurality of detectors;
  wherein said control unit controls a detected image forming section to operate, and said control unit does not control a non-detected image forming section to operate;
  wherein if print data contains a color for a detected image forming section, said control unit processes data for the color for the detected image forming section in a format that can be printed, and stores the data into a buffer;
  wherein if print data contains a color for a non-detected image forming section, said control unit neither processes data for the color for the non-detected image forming section in a format that can be printed, nor does it store the data into the buffer.

8. A printing apparatus including a plurality of image forming sections that are removably attached to a body of the printing apparatus and form images of different colors one over the other in registration on a medium, comprising:
  a receiving section that receives image data;
  a selecting unit that allows a user to select an image forming section that performs printing and an image forming section that does not perform printing; and
  a control unit that controls the plurality of image forming sections in such a way that when at least one image forming section is not selected and at least one image forming section is selected, the at least one image forming section selected by said selecting unit operates to form an image of a corresponding color on a medium;
  wherein each of the plurality of image forming sections having a corresponding transfer section, said transfer section receiving a transfer voltage irrespective of whether a corresponding image forming section is present in the printing apparatus.

9. The printing apparatus according to claim 8, further comprising a detecting section that detects whether a corresponding image forming section is present in the printing apparatus.

10. A printing apparatus including a plurality of image forming sections that are removably attached to a body of the printing apparatus and form images of different colors one over the other in registration on a medium, comprising:
  a receiving section that receives image data;
  a selecting unit that allows a user to select an image forming section that performs printing and an image forming section that does not perform printing;
  a control unit that controls the plurality of image forming sections in such a way that when at least one image forming section is not selected and at least one image forming section is selected, the at least one image forming section selected by said selecting unit operates to form an image of a corresponding color on a medium; and
  a display section that displays a message inquiring whether an image forming section currently displayed on said display section should be selected,
  wherein said selecting unit includes:
  a first switch that selects an image forming section currently displayed on said display section, the first switch being operated by a user; and
  a second switch that switches the message on said display section from the image forming section currently displayed on said display section to a next image forming section, the second switch being operated by the user when the image forming section currently displayed on said display section shoudl not be selected.

11. A printing apparatus, comprising:
  a plurality of image forming sections that are removably attached to a body of the printing apparatus and form images on a medium one over the other in registration, each one of the image forming sections being capable of forming an image of a respective color independently from the other image forming sections;
  a plurality of transfer sections each of which opposes a corresponding one of the plurality of image forming sections;
  a transporting section that transports a recording medium through the plurality of image forming sections;

a power supplying section that supplies a transfer voltage to said plurality of transfer sections;

a receiving section that receives image data;

a detecting section that detects whether a corresponding image forming section is present in the printing apparatus; and a control section that allows printing of image data only of a color corresponding to an image forming section detected by said detecting section, said control section controlling said power supplying section in such a way that said power supplying section supplies the transfer voltage not only to a transfer section corresponding to the image forming section detected by said detecting section but also to a transfer section corresponding to an image forming section not detected by said detecting section.

12. The printing apparatus according to claim 11, wherein each of the image forming sections comprises a respective photoconductive drum.

13. A printing apparatus comprising:

a plurality of image forming sections that are removably attached to a body of the printing apparatus and form images on a medium one over the other in registration, each one of the image forming sections being capable of fanning an image of a respective color independently from the other image forming sections;

a plurality of transfer sections each of which opposes a corresponding one of the plurality of image forming sections;

a transporting section that transports a recording medium through the plurality of image forming sections;

a power supplying section that supplies a transfer voltage to all of said plurality of transfer sections;

a receiving section that receives image data;

a detecting section that detects whether a corresponding image forming section is present in the printing apparatus; and a control section that controls all of image forming sections detected by said detecting section to perform printing in accordance with the image data, said control section controlling said power supplying section in such a way that said power supplying section supplies the transfer voltage not only to a transfer section corresponding to the image forming section detected by said detecting section but also to a transfer section corresponding to an image forming section not detected by said detecting section.

14. The printing apparatus according to claim 13, wherein each of the image forming sections comprises a respective photoconductive drum.

* * * * *